United States Patent
Lang et al.

(10) Patent No.: US 10,962,562 B2
(45) Date of Patent: Mar. 30, 2021

(54) VEHICLE VELOCITY INDICATOR

(71) Applicant: Bayerische Motoren Werke Aktiengesellschaft, Munich (DE)

(72) Inventors: Franziska Lang, Ventura, CA (US); Martin Francisco, Pasadena, CA (US); Eric Brown, North Hollywood, CA (US); Matthew Potter, Porter Ranch, CA (US); Paul Ferraiolo, Ventura, CA (US); Ross Carmichael, Everrett, WA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/548,718

(22) Filed: Aug. 22, 2019

(65) Prior Publication Data
US 2021/0055322 A1  Feb. 25, 2021

(51) Int. Cl.
*G01P 1/07* (2006.01)
*B60Q 9/00* (2006.01)

(52) U.S. Cl.
CPC . *G01P 1/07* (2013.01); *B60Q 9/00* (2013.01)

(58) Field of Classification Search
CPC .................... G01P 1/07; B60Q 9/00
See application file for complete search history.

(56) References Cited

U.S. PATENT DOCUMENTS

| | | | |
|---|---|---|---|
| 2008/0174415 A1* | 7/2008 | Tanida | B62D 15/029 340/438 |
| 2012/0126965 A1* | 5/2012 | Sanma | B62D 15/029 340/438 |
| 2015/0307022 A1* | 10/2015 | Nelson | B60W 50/16 701/36 |
| 2016/0264046 A1* | 9/2016 | Bochenek | B60D 1/30 |
| 2018/0011551 A1* | 1/2018 | Gothlin | B60K 37/04 |
| 2019/0283780 A1* | 9/2019 | Boulanger | G06F 3/0414 |

* cited by examiner

*Primary Examiner* — Sisay Yacob
(74) *Attorney, Agent, or Firm* — Crowell & Moring LLP

(57) ABSTRACT

A velocity indication system of a vehicle includes one or more velocity sensors configured to sense a vehicle velocity and to generate velocity data therefrom. The system also includes a control unit configured to receive the velocity data and to generate a control signal based on the velocity data. The system also includes a tactile velocity indicator. The tactile velocity indicator includes a frame that defines an opening therein. The tactile velocity indicator also includes a haptic element, at least partially protruding from the opening so as to be touchable by a passenger of the vehicle via the opening. The tactile velocity indicator also includes an electric motor configured to drive the haptic element in response to the control signal to move relative to the frame according to a haptic element velocity that corresponds to the sensed vehicle velocity.

20 Claims, 5 Drawing Sheets

VEHICLE VELOCITY INDICATOR

FIELD OF THE INVENTION

The present invention relates generally to velocity indicators, and in particular, to tactile velocity indicators that facilitate the ambient perception of the travelling velocity of a motor vehicle by passengers of the vehicle.

BACKGROUND OF THE INVENTION

Modern day motor vehicles are equipped with sensor systems that detect the travelling speed of the vehicle, as well as the direction of travel, and provide this information to the drivers or otherwise use this information to control aspects of the motor vehicle. Typically, velocity data from various sensors is transmitted to one or more vehicle system control units, which use the velocity data in accordance with respectively associated vehicle systems, e.g., speed control and other driver assistance systems, to control certain aspects of the motor vehicle.

In terms of providing the driver with information about the velocity of the motor vehicle, a control signal is generated from the velocity data. The control signal controls a speedometer to visually depict the vehicle speed via an electronically controlled analog-style pointer based gauge or a digital display. The direction of travel may also be visually depicted similarly.

Traditional speedometers, however, are premised on the assumption that the driver of the vehicle is the focal point for providing information such as vehicle speed. As such, the traditional speedometer is uniformly located in dashboard or front instrument panel of the vehicle, where the driver of the vehicle can see it and use the information to control the vehicle accordingly.

As the driving experience moves more towards reliance on autonomous electric vehicles, the driver seat of the vehicle becomes less of a focal point for conveying information relevant to control of the vehicle. Indeed, as motor vehicles become more autonomous, the role of driver may become ambiguous, shared among several passengers at any given time. And at the same time, the disconnect between drivers and the act of driving continues to grow as drivers increasingly occupy their commuting time with activities other than driving. As such, traditional driver-centric speedometers may no longer be viable.

What is needed is a velocity indicator that is more ambient, and is therefore not focused on the driver seat and the front instrument panel; that can indicate vehicular velocity to any or all of the passengers during autonomous driving, whether or not those passengers are actively participating in the act of driving; and that facilitates the quick re-establishing of control of vehicular speed by the passengers when desired.

As such, there is a need in the art for devices, systems and methods for tactile velocity indication that does not suffer from the above drawbacks.

SUMMARY OF THE INVENTION

Disclosed and claimed herein are devices, systems and methods for the tactile indication of vehicle travel velocity, including via a velocity indication system for the vehicle.

The velocity indication system includes one or more velocity sensors configured to sense a vehicle velocity and to generate velocity data therefrom. The system also includes a control unit configured to receive the velocity data and to generate a control signal based on the velocity data. The system also includes a tactile velocity indicator. The tactile velocity indicator includes a frame that defines an opening therein. The tactile velocity indicator also includes a haptic element, at least partially protruding from the opening so as to be touchable by a passenger of the vehicle via the opening. The tactile velocity indicator also includes an electric motor configured to drive the haptic element in response to the control signal to move relative to the frame according to a haptic element velocity that corresponds to the sensed vehicle velocity (e.g., as a scalar multiple).

Other objects, advantages, aspects and features of the present invention will be apparent to one skilled in the relevant art in view of the following detailed description of one or more exemplary embodiments.

BRIEF DESCRIPTION OF THE DRAWINGS

The features, objects, and advantages of the present invention will become more apparent from the detailed description, set forth below, when taken in conjunction with the drawings, in which like reference characters identify correspondingly throughout and wherein.

DETAILED DESCRIPTION OF THE PREFERRED EMBODIMENTS

Figure 1:
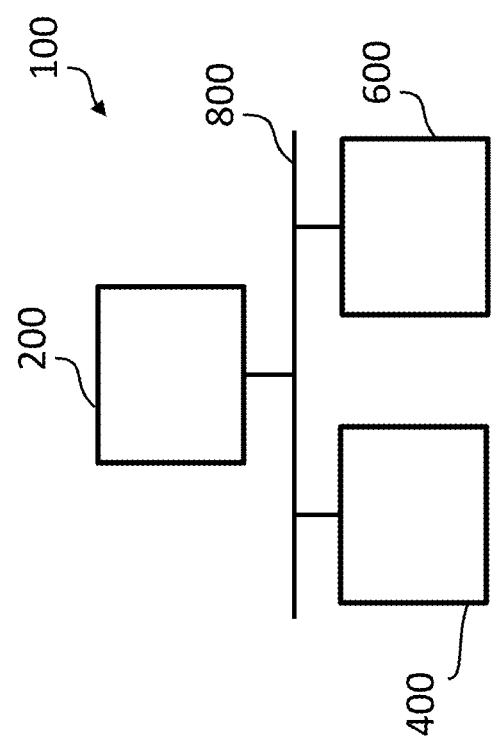
FIG. 1 is a schematic illustration of a vehicle velocity indication system according to the present invention.

The above described drawing figures illustrate the present invention in at least one embodiment, which is further defined in detail in the following description. Those having ordinary skill in the art may be able to make alterations and modifications to what is described herein without departing from its spirit and scope. While the present invention is susceptible of embodiment in many different forms, there is shown in the drawings and will herein be described in detail at least one preferred embodiment of the invention with the understanding that the present disclosure is to be considered as an exemplification of the principles of the present invention, and is not intended to limit the broad aspects of the present invention to any embodiment illustrated. It will therefore be understood that what is illustrated is set forth for the purposes of example, and should not be taken as a limitation on the scope of the present invention.

The present invention generally relates to tactilely indicating the travel velocity of a motor vehicle to one or more passengers of the motor vehicle. As used herein, the term "passenger" (and derivatives thereof) is intended to be inclusive of passengers who are operating the vehicle (e.g., drivers) and passengers who are not operating the vehicle (e.g., non-drivers).

FIG. 1 illustrates a tactile velocity indication system 100 for a vehicle (not shown), in accordance with at least one embodiment of the present invention. The system includes a tactile velocity indicator 200 communicatively coupled to one or more velocity sensors 400 and a control unit 600 via a wired or wireless network 800. In general, the tactile velocity indication system 200 is configured to provide a tactilely perceivable indication of the vehicle velocity, as sensed by the velocity sensors 400.

Figure 2:
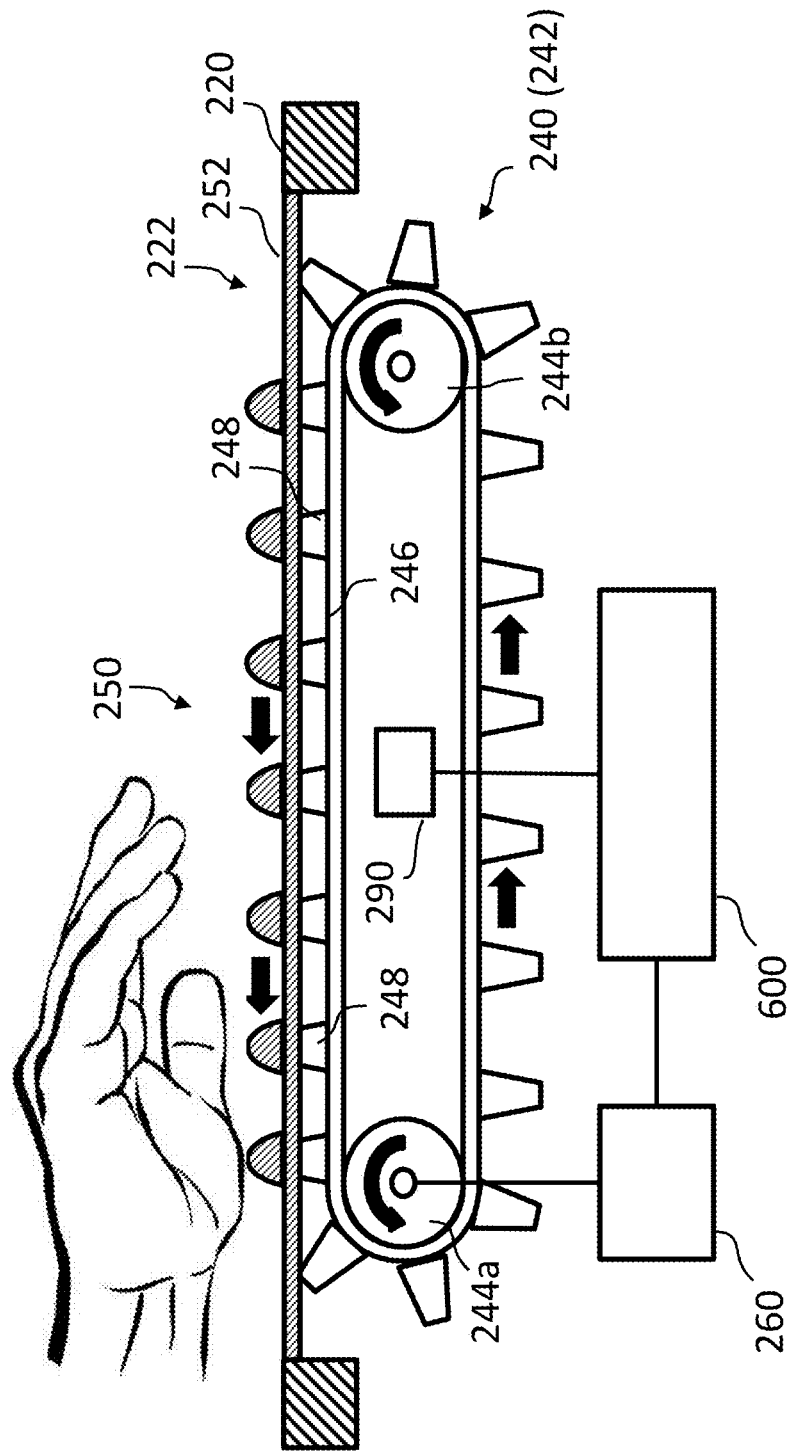
FIG. 2 is a schematic illustration of a tactile velocity indicator according to a first embodiment of the present invention.
Figure 3:
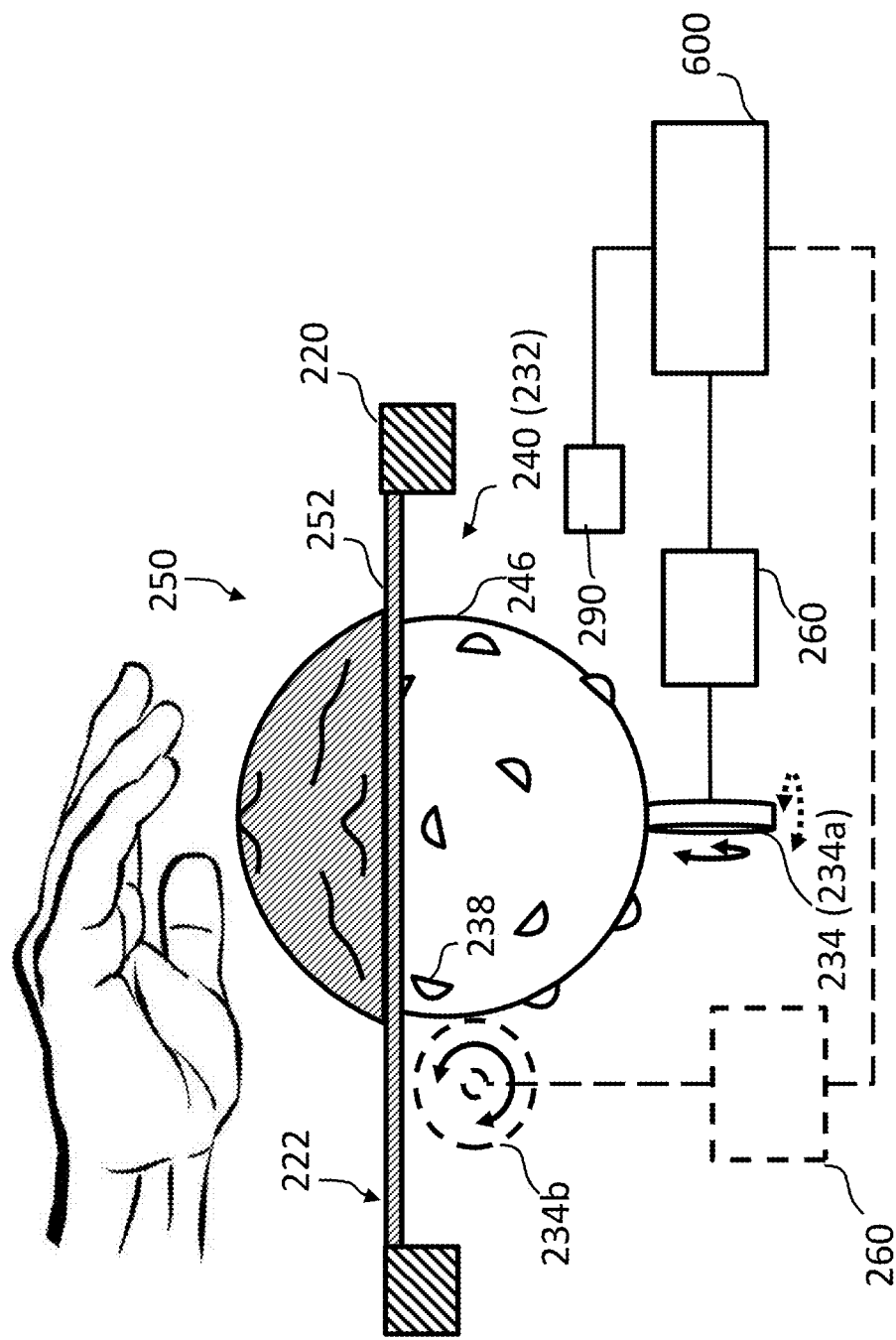
FIG. 3 is a schematic illustration of a tactile velocity indicator according to a second embodiment of the present invention.

FIGS. 2-3 illustrate exemplary embodiments of the tactile velocity indicator 200. In general, the tactile velocity indicator 200 includes a frame 220 and at least one haptic element 240 driven by an electric motor 260 to move relative to the frame 220 at a haptic element velocity, which is based on the sensed vehicle velocity.

For example, when vehicle velocity is sensed to be 40 mph in the forward direction, the haptic element 240 may be controlled to move forward at 10 mph. The passenger touching the haptic element 240 accordingly perceives the 10 mph forward movement of the haptic element 240. When the sensed vehicle velocity changes, the movement of the haptic element 240 also changes to reflect the changed vehicle velocity. In this manner, the user is informed of the vehicle velocity via touch perception.

Accordingly, the haptic element 240 is configured to be touched by the passenger during normal operation, such that via the touching, the passenger may tactilely perceive the haptic element velocity, which may indicate the vehicle velocity by being controlled to correspond to the vehicle velocity. To this end, the frame 220 includes an opening 222 via which the haptic element 240 is touchable. The frame 220 and its opening 222 are preferably sized so that the passenger may rest his/her hand at least partially on the frame 220 while touching the haptic element 240 by way of the opening 222. Moreover, the frame 220 is preferably embedded in a surrounding surface 280 of the vehicle, such as a vehicle panel, armrest, ceiling, floor, console, or other non-dashboard region, and the haptic element 240 includes a touchable portion 250 that may protrude from the frame 220 via the opening 222. In some embodiments, however, the touchable portion 250 may be positioned below the frame 220 and accessible via the opening 222.

The velocity sensors 400 are, in general, configured to detect the vehicle velocity, and to provide corresponding velocity data to the control unit via the network. The velocity sensors 400 may include any sensors configured, either alone or in combination with other components, to detect vehicular velocity and generate corresponding velocity data. The velocity sensors 400 may include sensors of other vehicle sub-systems, or may be dedicated to the tactile velocity indication system 10.

The network 800 may be a wired network, such as a computer bus, and/or a wireless network, such as a Bluetooth network. The network 800 is preferably an on-vehicle network communicatively coupling various vehicle components and systems, as is known in the art, but the network may also include an off-vehicle network.

The control unit 600 is, in general, configured to control the tactile velocity indicator 200, based on the velocity data, to provide the tactilely perceivable indication of the vehicle velocity. The control unit 600 includes a microcomputer, an input/output interface, and a drive circuit. The input/output interface receives the velocity data from the sensors, and provides the velocity data to the microcomputer. The microcomputer generates the control signal that sets a haptic element drive velocity. The microcomputer provides the control signal to the drive circuit, which drives the electric motor 260 at the haptic element drive velocity, based on the control signal output from the microcomputer. The driving of the electric motor 260 at the haptic element drive velocity causes the haptic element 240 to move, under the power provided by the electric motor 260, at the haptic element velocity.

The microcomputer includes a processor and a memory. The processor executes software instructions for generating the control signal to be provided to the drive circuit based on the received velocity data. The memory stores the software instructions therein for execution by the processor. The microcomputer also preferably includes logic that determines the appropriate haptic drive element velocity that results in the haptic velocity corresponding to the vehicle velocity, such as, for example, as a scalar multiple.

FIG. 2 schematically illustrates the tactile velocity indicator according to a first embodiment, in which the haptic element comprises a continuous loop belt 242 driven by a drive wheel 244a operatively coupled to the electric motor 260. The drive wheel 244 is driven by the electric motor 260, which is in turn controlled by the control unit 600 to move the continuous loop belt 242 in a longitudinal direction at the haptic element velocity.

The continuous loop belt 242 preferably comprises an outer surface 246 having a plurality of haptic ridges 248 extending therefrom. The haptic ridges 248 have a height normal to the outer surface 246, a width in the longitudinal direction of the continuous loop belt 242, and a length in a lateral direction perpendicular to the longitudinal direction. The length of the haptic ridges 248 is preferably such that the haptic ridges 248 extend laterally across the continuous loop belt 242. The haptic ridges 248 are preferably arranged according to a spaced sequence in which there is a distance between each haptic ridge 248 and the next. The height, width, length of and distance between the haptic ridges 248 is such that during normal operation, the passenger may tactilely perceive the haptic element velocity via maintaining his/her hand (or other body part) in position to be grazed by the haptic ridges 248 as they move at the haptic element velocity. Alternatively, or in addition, to the haptic ridges 248, the outer surface of the continuous loop belt may have a plurality of haptic bumps or other surface texture that the passenger may tactilely perceive in a similar manner.

The continuous loop belt 242 may further be suspended between the drive wheel 244a and an auxiliary wheel 244b such that the touchable portion 250 of the continuous loop belt 242 is accessible via the opening 222 in the frame 220 and may be touched by the passenger. One or more idler rollers (not shown) may also be provided to support the continuous loop belt 242 in position to be touched at the touchable portion 250.

Figure 4:
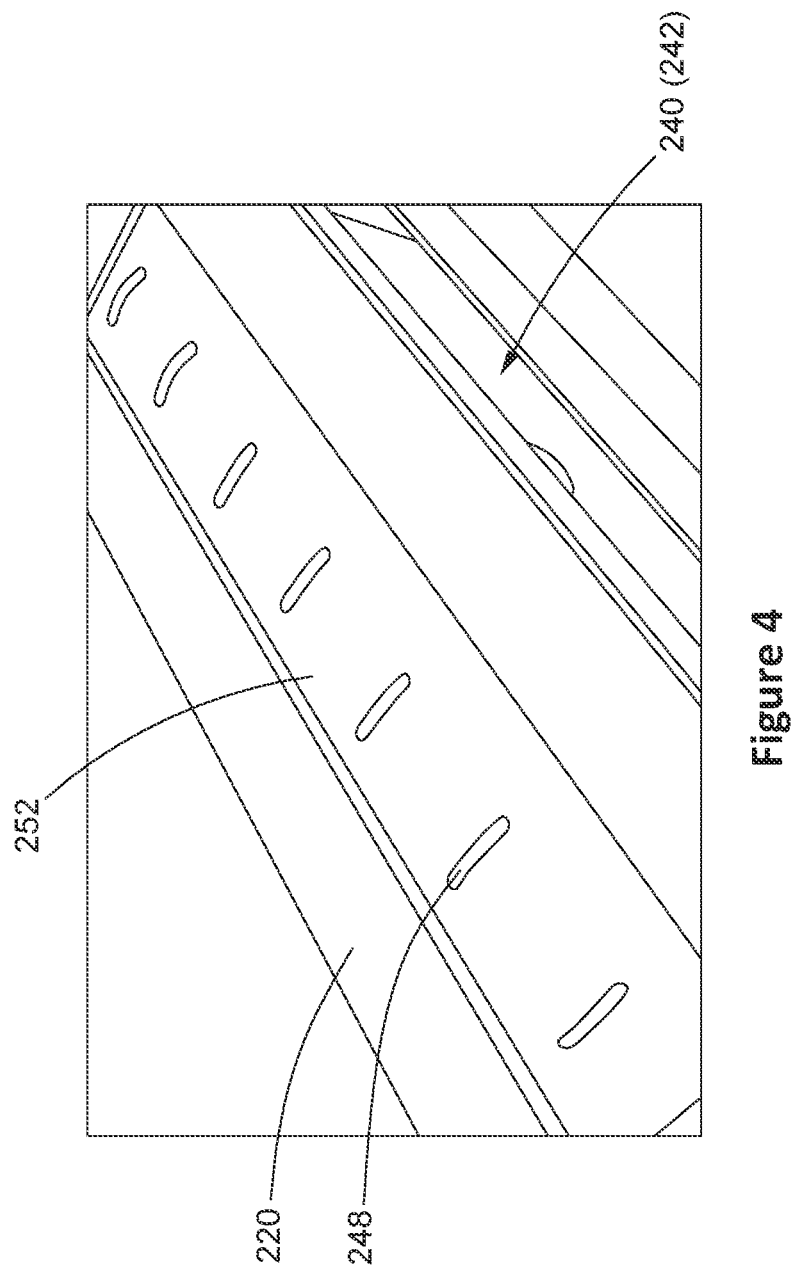
FIG. 4 is a top perspective view of the tactile velocity indicator according to the first embodiment of the present invention.

As further shown in FIGS. 2 and 4 the frame 220 may comprise a peripheral surface surrounding the opening 222. A flexible covering 252 may extend from the peripheral surface to cover the opening 222 such that the touchable portion 250 of the haptic element 240 is touchable through the flexible covering 252. In other words, the touchable portion 250 of the haptic element 240 may be positioned such that it pushes up against the flexible covering 252, enabling the passenger to feel the haptic element 240 through the flexible covering 252. As such, the flexible covering 252 is preferably made of a thin material through which objects and surface textures thereof are readily perceivable via touch. The flexible covering 252 is further preferably made of an elastic material.

FIG. 3 schematically illustrates the tactile velocity indicator according to a second embodiment, in which the haptic element 240 comprises a spherical element 232 driven by one or more drive wheels 234, each operatively coupled to its own electric motor 260. Whereas according to the first embodiment, the electric motors 260 moved the continuous loop belt 242 in the longitudinal direction, the drive wheels 234 of the second embodiment are configured to move the spherical element 232 at the haptic velocity that has vector components in both the longitudinal direction and the lateral direction. In this manner, the spherical element 232 can more precisely indicate the vehicle velocity as a vector that may not be solely forward or backwards with respect to the vehicle.

To this end, a pivoting drive wheel 234a may be provided to, via frictional force, roll the spherical element 232 thereon at the haptic element velocity. In order to change the direction of the haptic velocity independently of its magnitude, the pivoting drive wheel 234a may be controlled to pivot while rolling the spherical element 232. Alternatively, an orthogonal pair of drive wheels 234a and 234b may be provided to, via frictional force, roll the spherical element 232 thereon. Accordingly, each of the orthogonal drive wheels 234a and 234b is controlled to roll the spherical element 232 at a respectively associated orthogonal component of the haptic velocity.

As with the continuous loop belt 242, the spherical element 232 comprises an outer surface 236 having a plurality of haptic ridges, bumps or other surface texture 238 that the passenger may tactilely perceive in a similar manner. Moreover, the spherical element 232 may further be covered by a corresponding flexible covering 252 such that the touchable portion 250 of the spherical element 232 is touchable through the cover.

As also shown in FIGS. 2-3, one or more control sensors 290 may be operatively coupled to the control unit 600, and are configured to detect passenger touch-commands for adjusting the vehicle velocity. The touch-commands may include the passenger contacting the haptic element 240 so as to increase the haptic element velocity, such as by, for example, a swiping motion. The touch-commands may include the passenger contacting the haptic element 240 so as to decrease the haptic element velocity, such as by, for example, a pressing motion. The touch-commands may further include the passenger contacting the haptic element 240 so as to otherwise alter direction of the haptic element velocity, such as by, for example, a sideways sweeping motion. Accordingly, the control sensors may include one or more pressure sensors operatively coupled to the controller.

The control sensors 290 may be further configured to communicate the detected touch-commands to a velocity control system (not shown) of the vehicle to effectuate a corresponding adjustment in the vehicle velocity according to known methods for vehicle velocity control based on sensor input.

The tactile velocity indicator 200 may also include supporting visual elements (not shown) that visually emphasize and/or provide contrast to the movement of the haptic element 240. Such visual elements may include, for example, low angle lighting, rake lighting, and lighting elements embedded in the ridges 248 or surface texture 238 of the haptic element 240.

It will be further appreciated that the motion of the haptic element 240 may be magnetically induced, rather than or in addition to being mechanically induced, as in the exemplary embodiments of FIGS. 2-3. Accordingly, the motion may be induced via electromagnetic repulsion and/or attraction, using appropriately positioned electromagnets in place of some or all of the mechanical drive elements discussed above.

In at least one embodiment (not shown), the haptic element 240 comprises electrically activated shape memory ridges 248 or surface texture 238 embedded in or under the flexible covering 252. In such embodiments, a directional wavelike motion may be stimulated through the application of controlled currents through the haptic element 240. The control unit 260 may be accordingly configured to control the application of such currents, via e.g., a current source (not shown), in accordance with the desired speed indicating motion to be generated.

Figure 5:
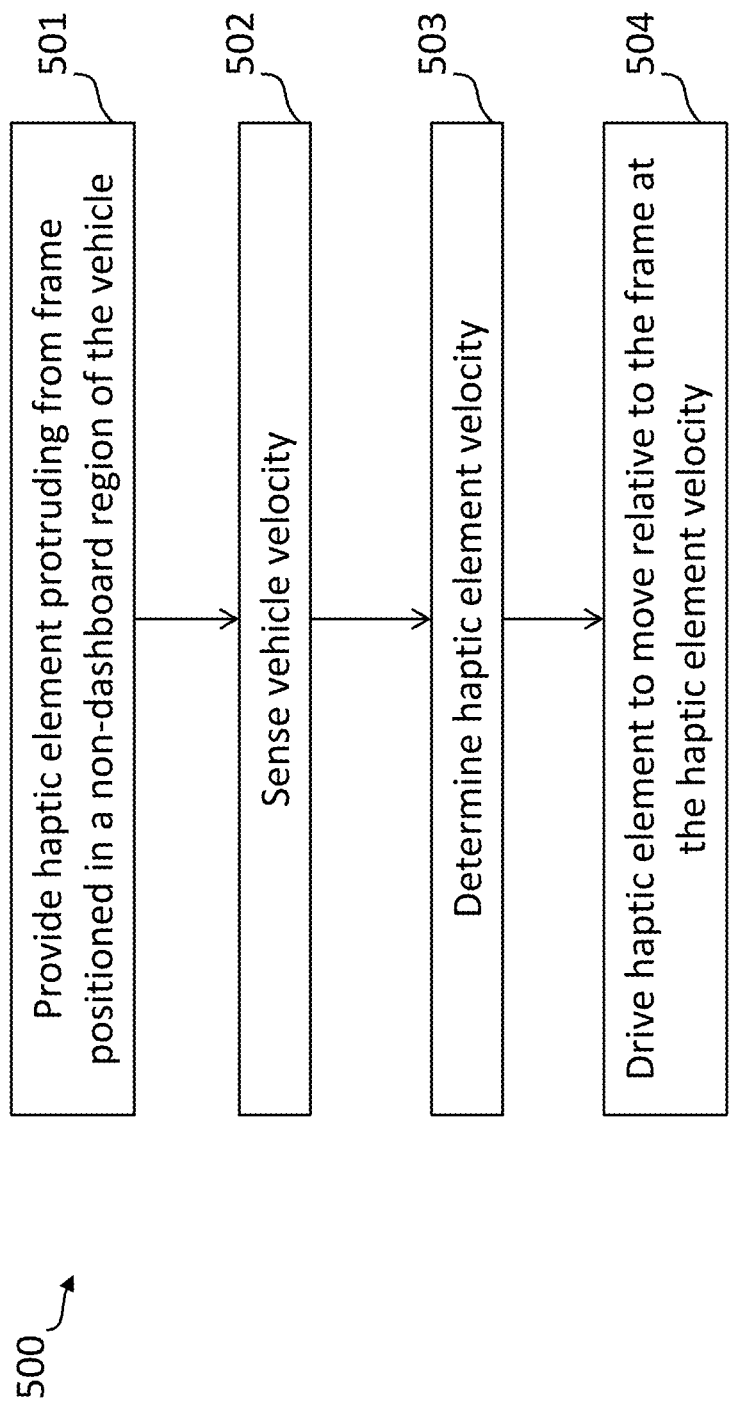
FIG. 5 is a flowchart illustrating an exemplary method according to one or more aspects of the present invention.

A method for tactilely indicating vehicle velocity will now be described with reference to FIG. 5.

At step 501, the tactile velocity indicator is provided in a non-dashboard location of the vehicle. As described herein, tactile velocity indicator includes the haptic element protruding from the frame via its opening so as to be touchable by the passenger via the opening.

At step 502, the vehicle velocity is sensed by the sensors, and vehicle velocity data corresponding to the vehicle velocity is generated.

At step 503, the haptic element velocity is determined based on the sensed vehicle velocity. The haptic element velocity preferably corresponds to the sensed vehicle velocity.

At step 504, the haptic element is driven to move relative to the frame at the haptic element velocity such that a passenger of the vehicle touching the moving haptic element thereby receives the tactile indication of the vehicle velocity, as described further herein.

The objects, advantages and features described in detail above are considered novel over the prior art of record and are considered critical to the operation of at least one embodiment of the present invention and to the achievement of at least one objective of the present invention. The words used in this specification to describe these objects, advantages and features are to be understood not only in the sense of their commonly defined meanings, but also to include any special definition with regard to structure, material or acts that would be understood by one of ordinary skilled in the art to apply in the context of the entire disclosure.

Moreover, various elements described herein generally include hardware and/or software/firmware, including but not limited to: processors, memories, input/output interfaces, operating systems and network interfaces, configured to effectuate the functionalities described herein. When implemented in software, the elements of the invention are essentially the code segments to perform the necessary tasks. The code segments can be stored in a processor readable medium or transmitted by a computer data signal. The "processor readable medium" may include any medium that can store information. Examples of the processor readable medium include an electronic circuit, a semiconductor memory device, a ROM, a flash memory or other non-volatile memory, a floppy diskette, a CD-ROM, an optical disk, a hard disk, etc.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C. An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

Moreover, the definitions of the words or drawing elements described herein are meant to include not only the combination of elements which are literally set forth, but all equivalent structures, materials or acts for performing substantially the same function in substantially the same way to obtain substantially the same result. In this sense, it is therefore contemplated that an equivalent substitution of two or more elements may be made for any one of the elements described and its various embodiments or that a single element may be substituted for two or more elements in a claim without departing from the scope of the present invention.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted in conjunction with the appended claims.

What is claimed is:

1. A velocity indication system of a vehicle, the system comprising:
   one or more velocity sensors configured to sense a vehicle velocity and to generate velocity data therefrom;
   a control unit configured to receive the velocity data and to generate a control signal based on the velocity data;
   a tactile velocity indicator comprising:
     a frame that defines an opening therein,
     a haptic element, at least partially protruding from the opening, wherein the haptic element is touchable by a passenger of the vehicle via the opening, and
     an electric motor configured to drive the haptic element, in response to the control signal, to move relative to the frame according to a haptic element velocity that corresponds to and changes with the sensed vehicle velocity.

2. The velocity indication system of claim 1, wherein the haptic element comprises:
   a continuous loop belt driven longitudinally by at least one drive wheel powered by the electric motor, in accordance with the control signal.

3. The velocity indication system of claim 2, wherein the continuous loop belt includes an outer surface comprising a sequence of spaced apart haptic ridges.

4. The velocity indication system of claim 2, wherein the continuous loop includes an outer surface comprising a plurality of haptic bumps.

5. The velocity indication system of claim 1, wherein the tactile velocity indicator further comprises:
   a flexible covering extending over the opening and pushed up against by the haptic element such that the movement of the haptic element is discernable by touch through the flexible covering.

6. The velocity indication system of claim 1, wherein the haptic element comprises:
   a spherical element driven by at least one drive wheel powered by the electric motor, in accordance with the control signal.

7. The velocity indication system of claim 6, wherein the spherical element includes an outer surface comprising a plurality of haptic bumps.

8. The velocity indication system of claim 6, wherein the spherical element is driven by a pair of orthogonal drive wheels, each powered by a respective electric motor, in accordance with the control signal.

9. The velocity indication system of claim 1, wherein the tactile velocity indicator is located in a vehicle seat, armrest, side panel, ceiling panel, or other non-dashboard location of the vehicle.

10. The velocity indication system of claim 1, wherein the tactile velocity indicator further comprises:
    one or more control sensors operatively coupled to the control unit, and configured to detect passenger touch-commands for adjusting the vehicle velocity.

11. A tactile velocity indicator for a vehicle, the tactile velocity indicator comprising:
    a frame that defines an opening therein;
    a haptic element at least partially protruding from the opening so as to be touchable by a passenger of the vehicle via the opening;
    a control unit configured to control an electric motor, based on a sensed vehicle velocity, to drive the haptic element to move relative to the frame at a haptic element velocity that corresponds to and changes with the sensed vehicle velocity.

12. The velocity indicator of claim 11, wherein the haptic element comprises:
    a continuous loop belt driven longitudinally by at least one drive wheel powered by the electric motor, in accordance with the control signal.

13. The velocity indicator of claim 12, wherein the continuous loop belt includes an outer surface comprising a sequence of spaced apart haptic ridges.

14. The velocity indicator of claim 12, wherein the continuous loop includes an outer surface comprising a plurality of haptic bumps.

15. The velocity indicator of claim 11, wherein the tactile velocity indicator further comprises:
    a flexible covering extending over the opening and pushed up against by the haptic element such that the movement of the haptic element is discernable by touch through the flexible covering.

16. The velocity indicator of claim 11, wherein the haptic element comprises:
    a spherical element driven by at least one drive wheel powered by the electric motor, in accordance with the control signal.

17. The velocity indicator of claim 16, wherein the spherical element includes an outer surface comprising a plurality of haptic bumps.

18. The velocity indicator of claim 16, wherein the spherical element is driven by a pair of orthogonal drive wheels, each powered by a respective electric motor, in accordance with the control signal.

19. The velocity indicator of claim 11, wherein the tactile velocity indicator is located in a vehicle seat, armrest, side panel, ceiling panel, or other non-dashboard location of the vehicle.

20. A method for tactilely indicating vehicle velocity, the method comprising:

providing a haptic element protruding from a frame positioned in a non-dashboard region of the vehicle;

sensing a vehicle velocity;

determining a haptic element velocity based on the vehicle velocity; and driving the haptic element to move relative to the frame at the haptic element velocity that corresponds to and changes with the sensed vehicle velocity such that a passenger of the vehicle touching the moving haptic element thereby receives a tactile indication of the vehicle velocity.

* * * * *